United States Patent
Davis et al.

(10) Patent No.: US 10,034,490 B2
(45) Date of Patent: *Jul. 31, 2018

(54) METHOD AND SYSTEM FOR PRODUCING REDUCED GLUTEN OAT MIXTURE

(71) Applicant: The Quaker Oats Company, Chicago, IL (US)

(72) Inventors: Brian Davis, Cedar Rapids, IA (US); Brian Drees, Cedar Rapids, IA (US); Joseph Griebat, Mechanicsville, IA (US)

(73) Assignee: The Quaker Oats Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/308,565

(22) PCT Filed: May 1, 2015

(86) PCT No.: PCT/US2015/028698
§ 371 (c)(1),
(2) Date: Nov. 2, 2016

(87) PCT Pub. No.: WO2015/168495
PCT Pub. Date: Nov. 5, 2015

(65) Prior Publication Data
US 2017/0079315 A1    Mar. 23, 2017

Related U.S. Application Data

(63) Continuation of application No. 14/701,205, filed on Apr. 30, 2015, now Pat. No. 9,364,866.
(Continued)

(51) Int. Cl.
 *B07B 15/00* (2006.01)
 *A23L 7/10* (2016.01)
 (Continued)

(52) U.S. Cl.
 CPC .............. *A23L 7/197* (2016.08); *B07B 13/02* (2013.01); *B07B 15/00* (2013.01); *B07C 5/3425* (2013.01); *B07C 2501/0018* (2013.01)

(58) Field of Classification Search
 CPC ......... B07C 1/00; B07C 1/342; B07C 5/3425; B07C 5/363; B07B 1/00; B07B 1/22;
 (Continued)

(56) References Cited

U.S. PATENT DOCUMENTS 677,789 A     7/1901  Nagel
3,630,754 A *  12/1971 Wayne .................. A23J 1/12
                                              426/430
(Continued)

OTHER PUBLICATIONS

International Search Report and Written Opinion dated Jul. 16, 2015 for PCT application No. PCT/US15/28698 (11 pages).
(Continued)

Primary Examiner — Joseph C Rodriguez
(74) Attorney, Agent, or Firm — James R. Gourley; Carstens & Cahoon, LLP

(57) ABSTRACT

A method and system is disclosed which uses a combination of optical and mechanical separation processes to remove gluten-containing grains from a mixture of oat kernels.

5 Claims, 5 Drawing Sheets

Related U.S. Application Data

(60) Provisional application No. 61/987,835, filed on May 2, 2014.

(51) Int. Cl.
  B07C 5/342 (2006.01)
  B07B 13/02 (2006.01)

(58) Field of Classification Search
  CPC ....... B07B 13/02; B07B 13/113; B07B 15/00; A23J 1/12; A23L 17/197
  See application file for complete search history.

(56) References Cited

U.S. PATENT DOCUMENTS

| | | | | |
|---|---|---|---|---|
| 4,269,766 | A | * | 5/1981 | Rao .......................... A23J 1/12 426/436 |
| 5,245,188 | A | * | 9/1993 | Satake .................. B07C 5/3416 250/339.06 |
| 5,733,592 | A | * | 3/1998 | Wettstein .............. B07C 5/3425 209/577 |
| 5,860,531 | A | * | 1/1999 | Satoru ...................... B03B 4/02 209/30 |
| 6,709,690 | B2 | * | 3/2004 | van Bommel ............ B02B 3/00 426/445 |
| 7,022,363 | B2 | * | 4/2006 | Cui .......................... B02B 1/02 426/482 |
| 8,227,012 | B2 | * | 7/2012 | DeLine .................... B02B 5/02 426/11 |
| 8,919,569 | B2 | * | 12/2014 | Bethke .................... B03D 1/00 209/173 |
| 9,364,866 | B2 | * | 6/2016 | Davis ................... B07C 5/3425 |
| 9,463,493 | B1 | * | 10/2016 | Arlinghaus ........... B07C 5/3425 |
| 9,700,919 | B1 | * | 7/2017 | Zietlow .................. B07B 13/00 |
| 2013/0168301 | A1 | | 7/2013 | Dell'Endice |
| 2014/0166549 | A1 | | 6/2014 | Ito |

OTHER PUBLICATIONS

Sarkar, AK, Specialty Milling: Handbook of Postharvest Technology, 2003, pp. 327, 358-372; ISBN: 0-8247-0514-9 (18 pages).
Gates, F., Role of heat treatment in the processing and quality of oat flakes, University of Helsinki, May 16, 2007 (69 pages).

* cited by examiner

METHOD AND SYSTEM FOR PRODUCING REDUCED GLUTEN OAT MIXTURE

BACKGROUND OF THE INVENTION

Technical Field

The present invention relates generally to a method and system for making an oat mixture with substantially reduced levels of gluten.

Background

Oat-based cereals are well accepted by consumers. This may be due, in part, to the widespread publication of the beneficial impact of oat bran in providing a healthful lowering of low density lipoprotein cholesterol components in the human system. The oat is a highly nutritious grain, not only in terms of possessing outstanding soluble fiber levels, but also in terms of the richness of its protein, mineral, and lipid content, as well as other nutritive components.

In recent years, there has been a rise in consumer interest in food products that do not contain gluten. Grain products that contain gluten include wheat, barley and rye. Although oats do not contain gluten, oats are harvested, transported and processed using equipment that is also used for wheat, barley and rye. Therefore, oat products can unintentionally include small amounts of gluten-containing grains, but still enough to render an oat-based food product not technically "gluten-free" according to government or food industry standards. Removing unwanted grains from an oat mixture is difficult due to the similarity in size, shape and appearance between oats and gluten-containing grains.

SUMMARY OF THE INVENTION

The present invention generally provides a system and method for removing unwanted grains from an oat kernel mixture. Incoming oats that have been harvested and transported to an oat processing facility are aspirated and screened initially. Large impurities such as corn and soybeans, as well as material smaller than the typical oats, such as weed seeds and other grains are removed. Lighter material like chaff and immature oats are removed with aspiration. The resulting oat mixture is mechanically cleaned in a first mechanical cleaning step by feeding them into an indented rotating cylinder cleaner. The cleaned oat stream is then mechanically cleaned again in a second mechanical cleaning step by feeding the cleaned oat stream into a second indented cylinder cleaner. In a preferred embodiment the indentation diameter is between about 6 and 7 millimeters.

The second cleaned oat stream is then destoned by feeding it into an angled, oscillating table that is rotating about a central axis that passes air up through the oat stream, causing heavy material (mostly dirt and rocks, with some wheat removal) to travel up the table and lighter matter (oats) to travel down the table and into the next step in the process.

The destoned stream is then fed into an optical sorter configured to expel gluten-containing grains from the oat stream. In a preferred embodiment, the optical sorter comprises at least one bichromatic camera that operates in the visible light spectrum, and at least one bichromatic camera that operates in the infrared spectrum. When the cameras detect a non-oat grain, a gas expeller fires, rejecting the non-oat grain from the stream. The optically sorted oat stream may then be optionally stored for a time in storage bins before proceeding to the next steps.

The next step in the process is a dehulling step, which removes the oat groat from the hull. This step is known in the art. The de-hulled oats are then optically sorted again, using equipment that is functionally similar to the optical sorting equipment used prior to the dehulling step, although less sophisticated optical sorting equipment may be used because the target for removal at this step is groats that are still attached to the hull. The de-hulled then optically sorted oat stream is mechanically screened to remove a substantial portion of the barley grains remaining in the oat stream. The mechanical screening equipment comprises a sieve that catches the barley but lets the oat groats pass through and proceed on to a kilning step, which is known in the art.

The next step in the process is a groat separation step, which uses equipment that is functionally similar to the equipment used to destone the mechanically cleaned oat stream. This step separates the groats into one or more oat grade streams, each of which passes through a third optical sorting step using equipment that is functionally similar to the previous two optical sorting steps, but is configured to identify and remove barley grains that have passed through the kilning step. The optically sorted oat stream may then optionally be further processed, such as by a flaking or cutting step, and optionally mixed with other ingredients such as flavoring ingredients, and optionally packaged.

In one embodiment, a method for processing oat kernels comprises: prior to a de-hulling step for an oat kernel stream, at least two of the following: mechanically cleaning the oat kernel stream by passing the oat kernel stream through a first rotating cylinder comprising a plurality of indentations on an inner surface of the first cylinder; density separating the oat kernel stream by passing the oat kernel stream over at least one oscillating gravity separation table; mechanically screening the oat kernel stream using at least one mesh screen to allow a mechanically screened oat kernel stream to pass through the mesh screen or capturing a mechanically screened oat kernel stream on the mesh screen, or both; optically sorting the oat kernel stream by passing the oat kernel stream through an optical sorter that uses at least one camera to identify at least one non-oat constituent of the oat kernel stream, and a gas expeller to reject any identified non-oat constituent into a waste stream; after the de-hulling step but before a kilning step for a de-hulled oat stream, at least two of the following: mechanically cleaning the de-hulled oat stream by passing the de-hulled oat stream through a second rotating cylinder comprising a plurality of indentations on an inner surface of the second cylinder; density separating the de-hulled oat kernel stream by passing the de-hulled oat kernel stream over at least one oscillating gravity table; mechanically screening the de-hulled oat stream using at least one mesh screen to allow a mechanically screened de-hulled oat stream to pass through the mesh screen or capturing a mechanically screened de-hulled oat stream on the mesh screen, or both; and optically sorting the de-hulled oat stream by passing the de-hulled oat kernel stream through an optical sorter that uses at least one camera to identify at least one non-oat constituent of the de-hulled oat stream, and a gas expeller to reject any identified non-oat constituent into a waste stream; and after a kilning step for a kilned oat stream, at least two of the following: mechanically cleaning the kilned oat stream by passing the kilned oat stream through a third rotating cylinder comprising a plurality of indentations on an inner surface of third cylinder; density separating the kilned oat stream by passing the kilned oat stream over at least one oscillating gravity separation table; mechanically screening the kilned oat stream using at least one mesh screen to allow a mechanically screened kilned oat stream to pass through the mesh screen or capturing a mechanically screened kilned oat stream on the mesh screen, or both; optically sorting the kilned oat stream by passing the kilned oat stream through an optical sorter that uses at least one camera to identify at least one non-oat constituent of the kilned oat stream, and a gas expeller to reject any identified non-oat constituent into a waste stream; wherein the method produces an oat stream with a final gluten content which is lower than an initial gluten content of the oat kernel stream.

In one embodiment, the non-oat constituent is a gluten-containing grain. In another embodiment, prior to the de-hulling step, at least three of the mechanically cleaning, density separating, mechanical screening or optically sorting steps occur. In still another embodiment, after the dehulling step but before the kilning step, at least three of the mechanically cleaning, density separating, mechanical screening or optically sorting steps occur. In another embodiment, after the kilning step, at least three of the mechanically cleaning, density separating, mechanical screening or optically sorting steps occur.

In another embodiment of the invention, a system for removing at least one non-oat constituent from an incoming oat kernel stream comprises: prior to de-hulling: a first mechanical screener comprising a first screen which allows oat kernels to pass through and captures oat kernel stream constituents larger than oat kernels, or a second screen which captures oat kernels on the second screen and allows oat kernel stream constituents smaller than oat kernels to pass through, or both the first screen and second screen; a first density separator comprising at least one oscillating table that separates the oat kernel stream into at least two fractions based on density of oat kernel stream constituents; a second density separator comprising at least one oscillating table that separates the oat kernel stream into at least two fractions based on density of oat kernel stream constituents; a first mechanical cleaner comprising a first rotating cylinder comprising a plurality of indentations on an inner surface of the first cylinder; a second mechanical cleaner comprising a second rotating cylinder comprising a plurality of indentations on an inner surface of the second cylinder; and a first optical sorter comprising at least one bichromatic camera operating in the visible light spectrum and at least one bichromatic camera operating in the infrared light spectrum, wherein the cameras identify at least one non-oat constituent of an oat kernel stream, and a gas expeller which rejects any identified non-oat constituent into a waste stream; after de-hulling and before kilning: a third mechanical cleaner comprising a third rotating cylinder comprising a plurality of indentations on an inner surface of the third cylinder; a third density separator comprising at least one oscillating table that separates a de-hulled oat stream into at least two fractions based on density of de-hulled oat stream constituents; a fourth mechanical cleaner comprising a fourth rotating cylinder comprising a plurality of indentations on an inner surface of the fourth cylinder; a second mechanical screener; and a fifth mechanical cleaner comprising a fifth rotating cylinder comprising a plurality of indentations on an inner surface of the fifth cylinder; and after kilning: a sixth mechanical cleaner comprising a sixth rotating cylinder comprising a plurality of indentations on an inner surface of the sixth cylinder; a fourth density separator comprising at least one oscillating table that separates a kilned oat stream into at least two fractions based on density of kilned oat stream constituents; and a second optical sorter which rejects at least one identified non-oat constituent from the kilned oat stream.

In one embodiment, each system component before de-hulling is in series. In another embodiment each system component after kilning is in series. In another embodiment, the indentations on each mechanical cleaner comprise a diameter of between about 6 and 8 millimeters.

The creation of oat-based products using the methods described herein may allow manufacturers the ability to label their products as "gluten-free" because they meet industry or government standards regarding the same. Gluten-sensitive consumers would thus have the option to purchase and consume oat-based products with far less risk of gluten contamination.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Oats are cereal grains suitable for human consumption, commonly in the form of oatmeal. Alternatively, they may be used as an ingredient in forming oat-based products, such as granola bars and the like. Oat-based products have recently experienced a resurgence in popularity as a result of the increasing number of studies documenting health benefits derived from consuming oats, such as the promotion of healthy heart function. However, oat-based products sometimes contain non-trivial amounts of gluten-containing grains because it is difficult to separate such grains out from a stream or batch of harvested oats.

Figure 1:
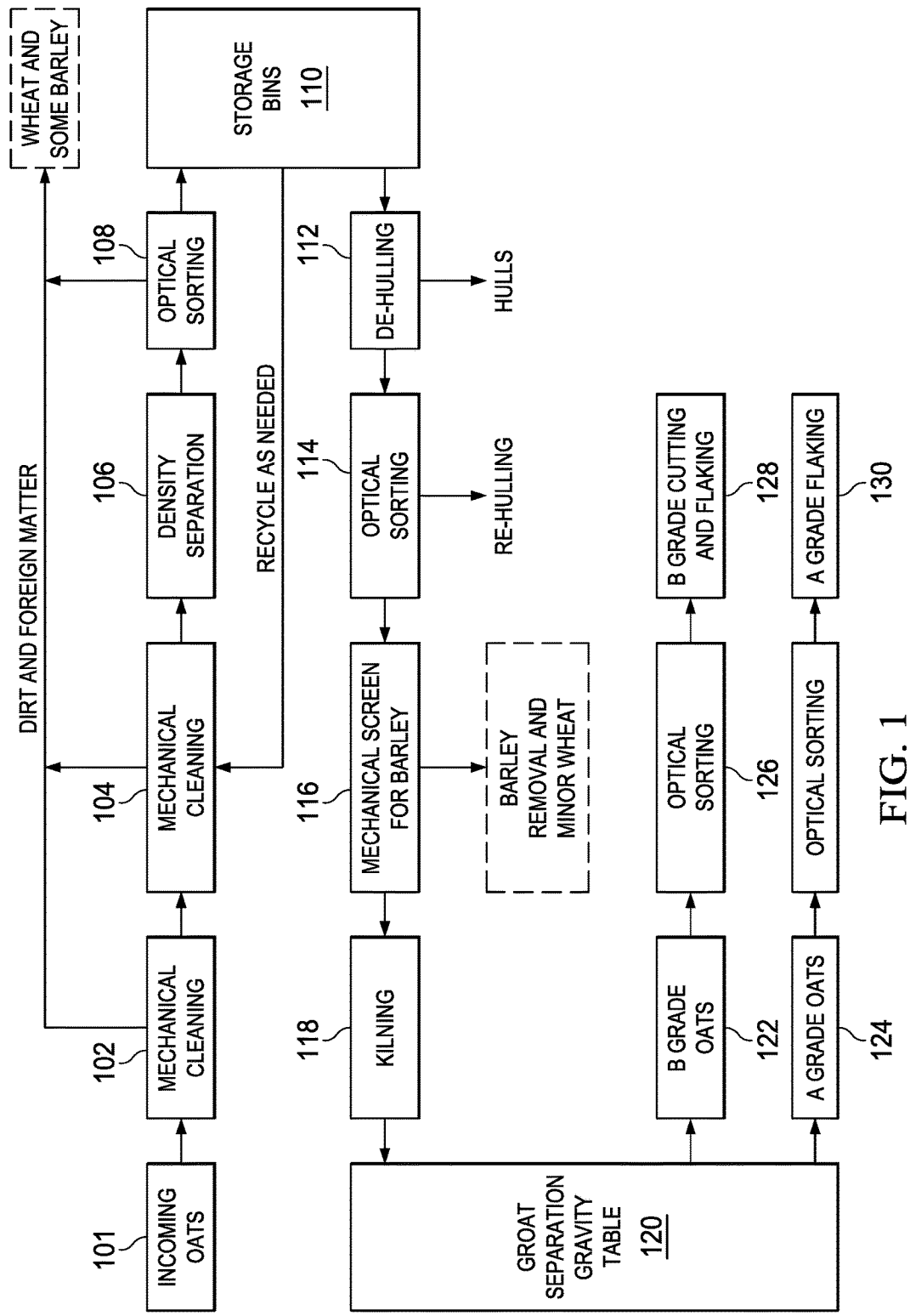
FIG. 1 is a flow chart illustrating a first exemplary embodiment of the method of the present invention.

Referring now to FIG. 1, incoming oat kernels 101 are first subjected to a first mechanical cleaning step 102. In a preferred embodiment, the first mechanical cleaning step uses a rotating cylinder comprising a plurality of indentations on its interior surface to capture and remove dirt, other foreign matter, as well as wheat and some barley, from the incoming oat stream. In one embodiment, the rotating cylinder used in the first mechanical cleaning step. In a preferred embodiment, the diameter of the indentation is between about 6 and 7 millimeters. One example of mechanical cleaning equipment that can be used in accordance with certain embodiments of the present invention is sold by Cimbria Heid GmbH of Austria.

The oat stream is fed into one end of the rotating cylinder. Wheat and barley grains (as well as other foreign matter) embed themselves into the indentations due to gravity at the bottom of the cylinder, and then fall out of the indentations at a certain point as they rotate up with the wall of the cylinder. The grains and other foreign matter that fall out of the indentations are collected in a separate stream, whereas the oat stream that passes through the cylinder without falling into the indentations proceeds to the next step.

The mechanically cleaned oat stream is then fed into a second mechanical cleaning step 104. The equipment used for this step is functionally equivalent or similar to the equipment used in the first mechanical cleaning step. Here again, a cleaned oat stream passes through the rotating cylinder without getting caught and removed by the indentations. This step removes a second fraction of wheat and barley from the oat stream.

The oat stream is then subjected to a destoning step 106. Destoning processes and equipment are known in the art, but generally, in one example embodiment, the oat stream is fed into an angled, rotating table which creates a fluidized bed by passing air up through the oat stream as the table is rotated. During this process, heavy material travels up the table and is collected in a waste stream, and the lighter oat material passes down the table and is collected in a destoned oat stream. Other processes that separate the oat stream into fractions based on density may also be used in accordance with the present invention.

Figure 3:
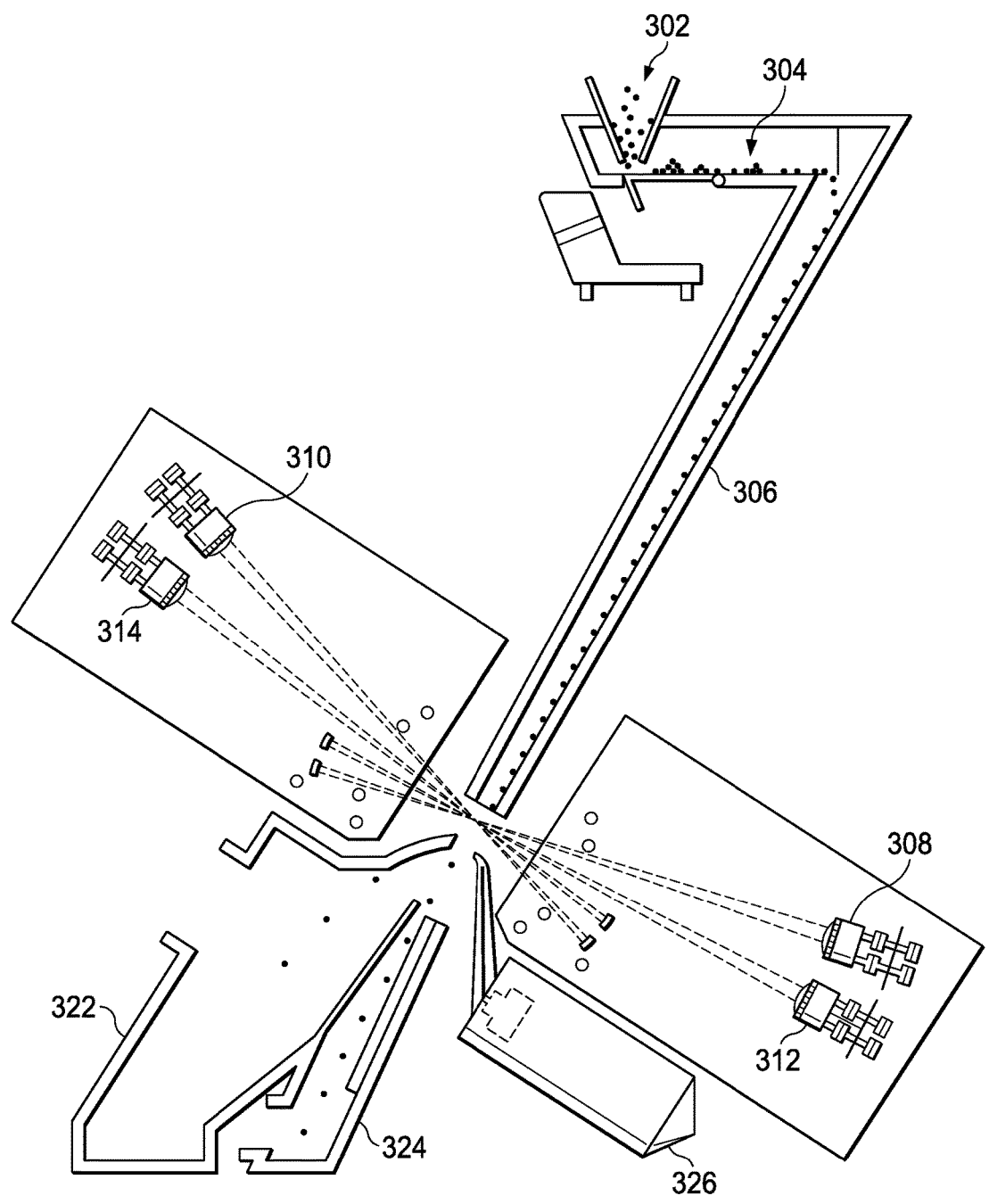
FIG. 3 is a diagrammatic view of an optical sorter which can be used in accordance with one embodiment of the present invention.

The destoned oat stream is then subjected to a first optical sorting step 108. Referring now to FIG. 3, therein is depicted a diagrammatic representation of one embodiment of an optical sorter 300 that can be used in accordance with the present invention. As shown therein, an oat stream 302 is fed into the inlet 304 of the sorter, which is typically at or near the top of the device. The stream is thinned and fed in a controlled manner down a chute 306 where the oats and other constituents of the oat stream fall down and into the line of sight of four cameras.

In a preferred embodiment, the cameras are bichromatic cameras, with at least one operating in the visible light spectrum 312 and 314, and at least one operating in the infrared light spectrum 308 and 310. Bichromatic cameras more accurately detect non-oat constituents than monochromatic cameras because color differences between oats and other grains are difficult to discern. If any camera detects a non-oat constituent in the oat stream, expeller 320 shoots a stream of air or other gas at the identified non-oat constituent, causing it to be removed from the oat stream and collected in a waste stream 322. Although a minor fraction of oats may also be expelled with the non-oat constituents, substantially all of the oats in the oat stream pass through the optical sorter and are collected in an optically sorted oat stream 324. In a preferred embodiment, the main targets for removal at this optical sorting step are at least one of wheat and rye grains.

The optically sorted oat stream may optionally be stored 110 and/or transported, or a portion of it may be recycled back to any of the previous steps, before being subjected to a dehulling step 112. Dehulling of oats is a process that is known in the art. It generally involves impacting the oat kernels with a surface with enough force to separate the oat groat from the hull. The denser oat groat is then separated from the lighter hull, which comes off the process as a waste stream. Oat groats are the primary oat fraction that is used for human consumption.

The dehulled oat groat stream 114 is then subjected to another optical sorting step. The equipment used for the second optical sorting step may be substantially similar to the equipment used in the first optical sorting step. However, monochromatic cameras and fewer cameras may be used in this step. The primary target for removal at this point in the process is groats which have not been successfully separated from the hull. Optical sorting systems can more easily distinguish a separated groat from a groat with the hull attached. The waste stream from this optical sorting step may be recycled, in one embodiment, back to the dehulling step.

The optically sorted groat stream is then optionally subjected to a mechanical screening process 116 to remove barley primarily, but also some wheat. In the mechanical screening process, the groat stream is passed through at least one sieve, which is sized such that groats pass through the sieve and barley and some wheat grains are retained on the sieve. In a preferred embodiment, the mesh opening size of the sieve or sieves used in this step can range from 2.4 to 2.7 millimeters, inclusive of all intervening ranges. Furthermore, the screens used to mechanically separate the barley from the groats at this step may be any shape practicable, including flat screens or cylindrical screens.

The groat product stream emerging from the mechanical screening step is then subjected to a kilning step 118. During kilning, the groats are stabilized against off-flavors and rancidity by subjecting them to heat and moisture treatments to denature the enzymes (primarily lipase) responsible for breaking down the lipids present in the groat. Kilning processes are known in the art and any known or developed kilning process can be used in accordance with the present invention.

The kilned groats may then be optionally sorted 120 into one or more oat grades 122 and 124 based on density. Equipment suitable for this step is similar to the equipment used for the destoning step described above.

The groats are then subjected to a final, third optical sorting step 126, which uses equipment that is substantially similar in function to the equipment used in the first and second optical sorting step. In this step, the main target for removal is barley because it is easier for the optical sorting equipment to discern a groat from a barley grain after they have passed through the kilning process.

The optically sorted groats may optionally then be cut, flaked, milled, or screened, or any combination thereof, according to the preference of a practitioner of the present invention.

Figure 2:
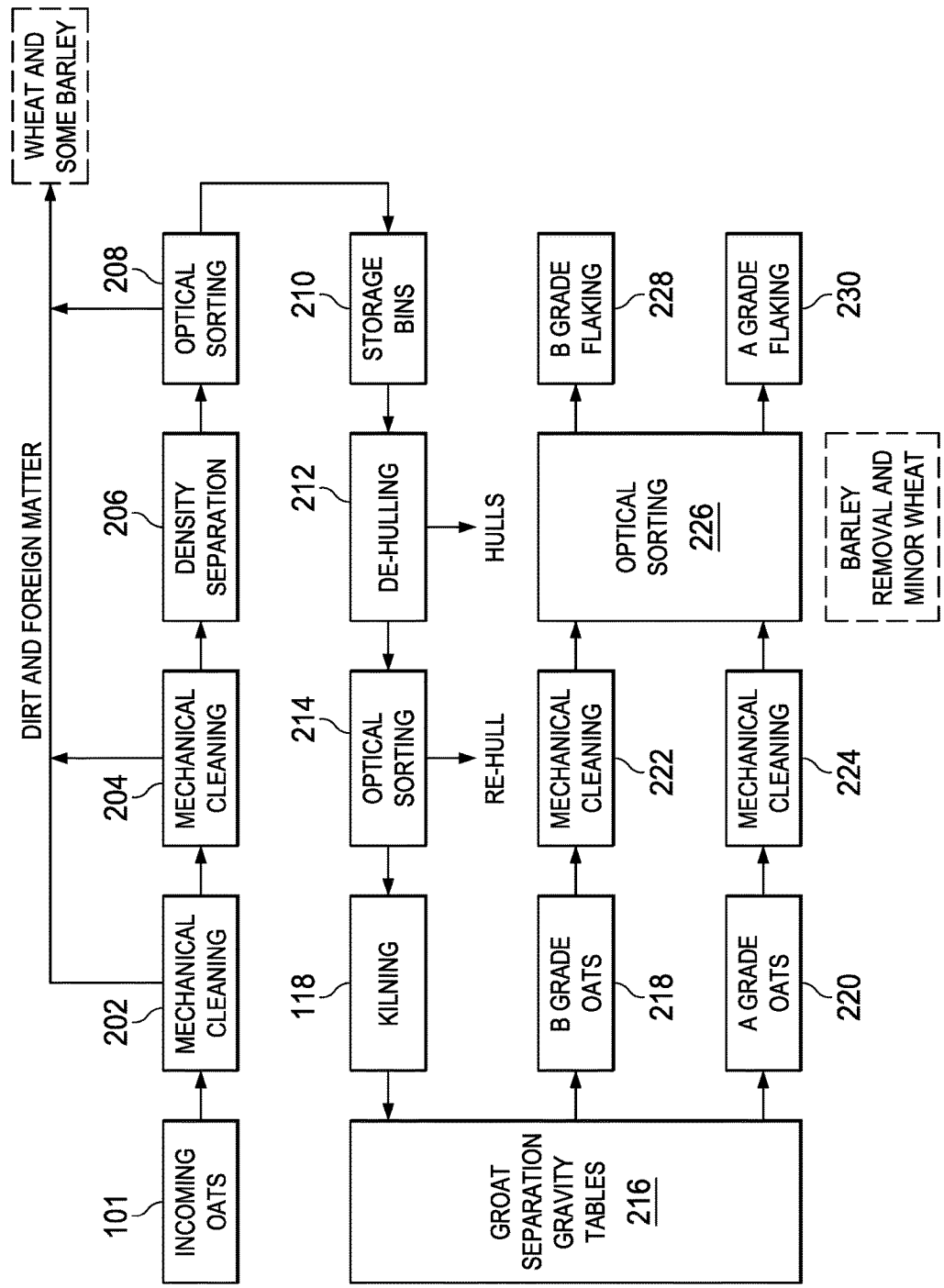
FIG. 2 is a flow chart illustrating a second exemplary embodiment of the method of the present invention.

An alternative exemplary embodiment of the inventive oat processing method is disclosed in FIG. 2. There, incoming oats 101 are subjected to two mechanical cleaning steps 202, 204 using the indented cylinders described above, and another mechanical cleaning step 206 using a gravity table as described above. The cleaned oats are optically sorted 208, and temporarily stored in storage bins 210. The oat mixture is subjected to a dehulling step 212 and second optical sorting step 214 before kilning 118. The kilned oat mixture is then subjected to a gravity table separation step 216, and the output is separated into at least two different grades of oats 218 and 220. Those oat grade fractions are mechanically cleaned and optically sorted again to remove any barley and wheat remaining. The oats can then be flaked 228 or 230, or subjected to further processing as desired.

Figure 4:
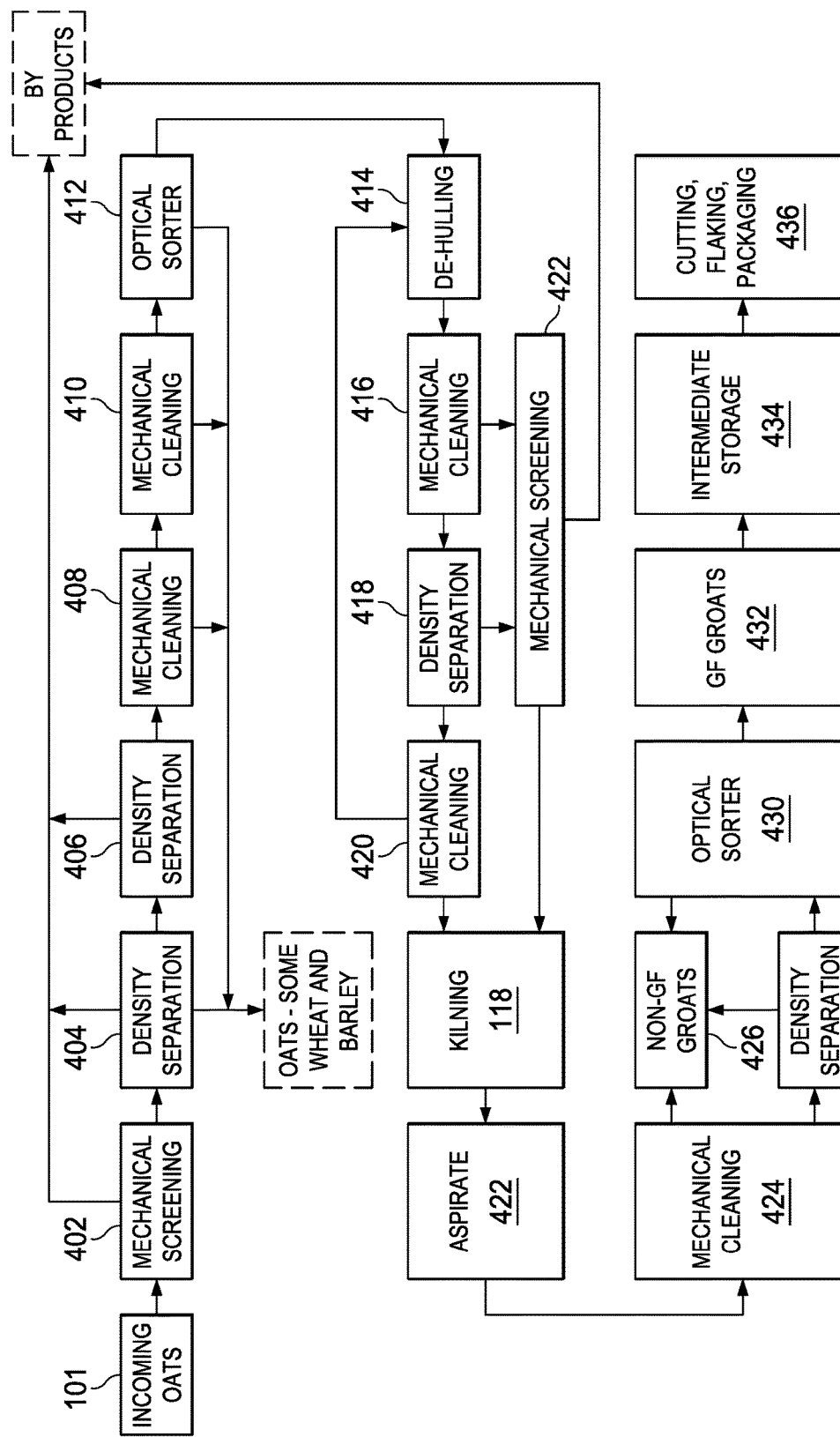
FIG. 4 is a flow chart illustrating a third exemplary embodiment of the method of the present invention.

FIG. 4 depicts another embodiment of the inventive oat processing system and method. As shown therein, incoming oats 101 are subjected to a mechanical separation step 402 by passing the oat mixture through a screen, similar to the mechanical screening step 116 shown in FIG. 1. The mechanical screening step may be used to remove larger corn, wheat and barley grains, and allow the smaller oat grains to pass through to the next processing steps. The mechanical screening step may also be used to filter finer particles from the incoming oat mixture by capturing oat kernels on top of a screen that allows finer particles to pass through. The mechanical screening step may also both screen larger particles out of the incoming oat stream and screen finer particles. The screened oat mixture is then separated using a gravity table density separation step 404, similar to the density separation step 120 shown in FIG. 1. This density separation step may be repeated 406 with similar equipment. Next, the oat mixture is mechanically cleaned by passing it through at least one rotating indented cylinder 408 and 410, similar to the mechanical cleaners described above for FIG. 1 reference numerals 102 and 104. In a preferred embodiment, the diameter of the indentations in the first mechanical cleaning step 408 is between 6 and 8 mm, and most preferably 8 mm. In a preferred embodiment, the diameter of the indentations in the second mechanical cleaning step 410 is between 6 and 8 mm, and most preferably 6.75 mm.

In the method and system described in FIG. 4, the mechanically cleaned oats are optically sorted 412 using equipment as described above with respect to steps 108 or 114 in FIG. 1. The optically sorted oats then pass to a dehulling step 414 as described above for step 112 in FIG. 1. The dehulled oats are then mechanically cleaned 416 using a rotating indented cylinder, as described herein above. Preferably, the indentation diameter used in this step is between 6 and 8 mm, and more preferably about 8 mm. The oats that pass through the mechanical cleaning cylinder at 416 without getting caught in the indentations go to a density separation step 418 similar to step 404. The oat fraction that emerges from the density separation step 418 is subjected to kilning 118. The waste stream from density separation step 418 and mechanical cleaning step 416 is passed through a mechanical screen, and the pass through stream of oats is also subjected to kilning 118.

The kilned oats are then aspirated 422 to remove light materials from the kilned oats and subjected to another mechanical cleaning step 424 using an indented rotating cylinder. The indentation diameter at step 424 is preferably between 6 and 8 mm. The oats that pass through the rotating cylinder are subjected to another gravity table density separation step 428 and optical sorting step 430. The stream of oats emerging from the optical sorter 430 are gluten-free oats. The waste stream from steps 424, 428 and 430 are collected into a non-gluten-free oat stream, which can be consumed by humans who are tolerant of gluten. The oats may optionally be intermediately stored 434 and cut, flaked or packaged 436, according to the preference of the practitioner of the present invention.

Figure 5:
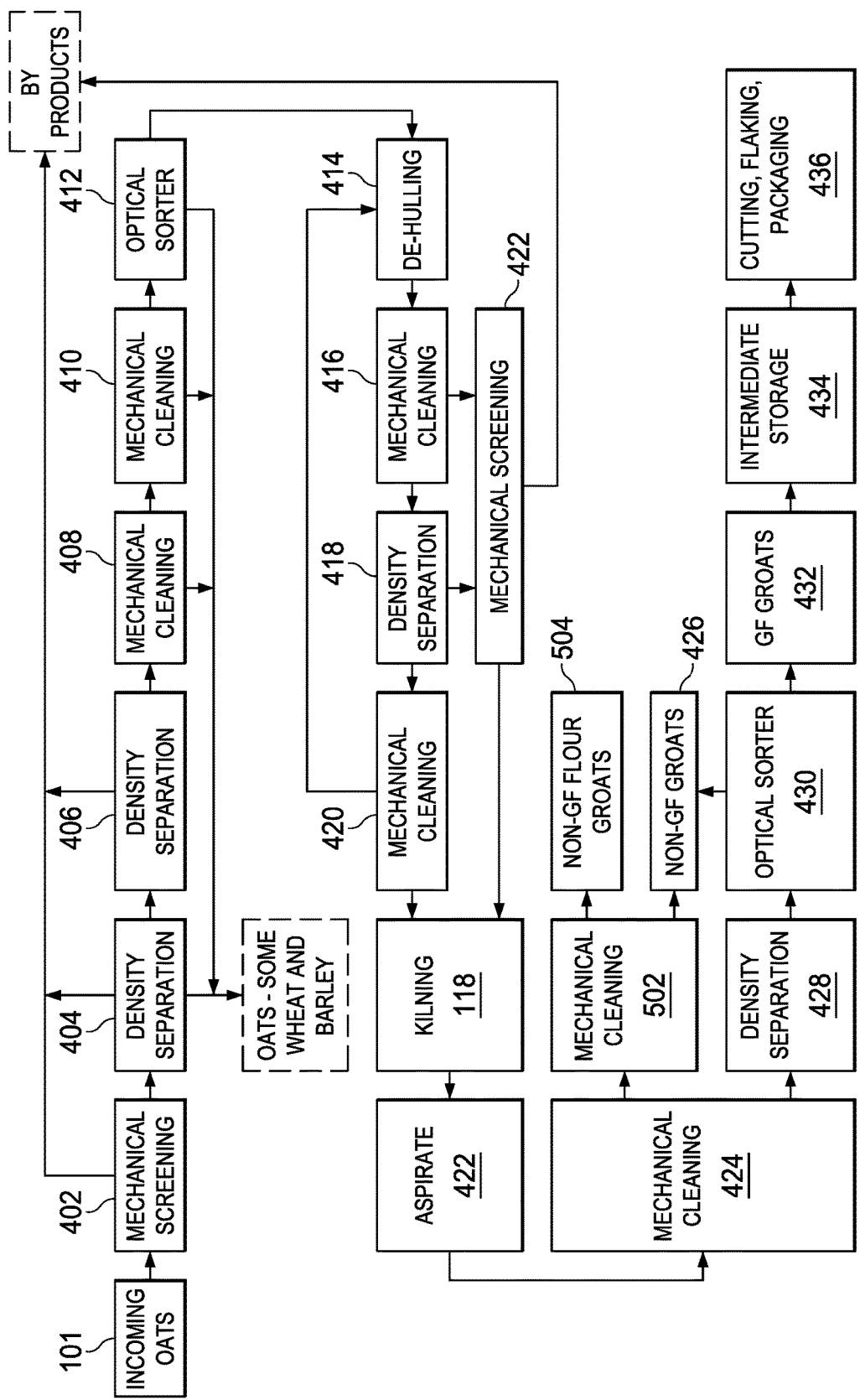
FIG. 5 is a flow chart illustrating a fourth exemplary embodiment of the method of the present invention.

FIG. 5 depicts an alternative embodiment of the inventive method and system. The process is identical to FIG. 4 until the kilned oats have been mechanically cleaned by a rotating indented cylinder at 424. Thereafter, the waste stream from the rotating indented cylinder is mechanically cleaned 502 again by a rotating cylinder with an indentation diameter of between 4.5 and 6 mm, and most preferably 5.0 mm. The fraction that passes through the cylinder without being captured by the indentations is a non-gluten free flour groat stream 504. The waste stream from mechanical cleaning step 502 becomes a part of the non-gluten free oat stream 426.

In other embodiments, the incoming oat streams for the processes depicted in FIG. 1, 2, 4 or 5 are pre-processed by at least one of mechanical screening, density separation and mechanical cleaning prior to being processed by the steps shown in those Figures.

The groat stream that emerges from the inventive process and system comprises substantially lower amounts of gluten-containing grains than groat streams produced by known processes. The method and system described above was tested on incoming oat kernel streams. The target upper limit for the tests was less than 20 parts per million (ppm) gluten in the final groat stream. The gluten content of a fully processed groat stream was measured 40 times over a 14-hour period after the process had reached steady-state, and was found to comprise an average gluten content of about 2.63 ppm, with a standard deviation of 1.7 ppm. In a separate test, the gluten content of fully processed groat stream was measured 30 times over a 6-hour period after the process had reached steady-state, and was found to comprise an average gluten content of about 3.93 ppm, with a standard deviation of 2.92. Based on all of the tests that were run, the applicants herein have statistical confidence that less than 1 in 10,000 final oat products made with the processed groat stream produced by the inventive system and method would contain more than 20 ppm gluten.

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A system for removing at least one non-oat constituent from an incoming oat kernel stream comprising:

prior to de-hulling:
    a first mechanical screener comprising a first screen which allows oat kernels to pass through and captures oat kernel stream constituents larger than oat kernels, or a second screen which captures oat kernels on the second screen and allows oat kernel stream constituents smaller than oat kernels to pass through, or both the first screen and second screen;
    a first density separator comprising at least one oscillating table that separates the oat kernel stream into at least two fractions based on density of oat kernel stream constituents;
    a second density separator comprising at least one oscillating table that separates the oat kernel stream into at least two fractions based on density of oat kernel stream constituents;
    a first mechanical cleaner comprising a first rotating cylinder comprising a plurality of indentations on an inner surface of the first cylinder;
    a second mechanical cleaner comprising a second rotating cylinder comprising a plurality of indentations on an inner surface of the second cylinder; and
    a first optical sorter comprising at least one bichromatic camera operating in the visible light spectrum and at least one bichromatic camera operating in the infrared light spectrum, wherein the cameras identify at least one non-oat constituent of an oat kernel stream, and a gas expeller which rejects any identified non-oat constituent into a waste stream;

after de-hulling and before kilning:
    a third mechanical cleaner comprising a third rotating cylinder comprising a plurality of indentations on an inner surface of the third cylinder;

a third density separator comprising at least one oscillating table that separates a de-hulled oat stream into at least two fractions based on density of de-hulled oat stream constituents;

a fourth mechanical cleaner comprising a fourth rotating cylinder comprising a plurality of indentations on an inner surface of the fourth cylinder;

a second mechanical screener; and after kilning:

a fifth mechanical cleaner comprising a fifth rotating cylinder comprising a plurality of indentations on an inner surface of the fifth cylinder;

a fourth density separator comprising at least one oscillating table that separates a kilned oat stream into at least two fractions based on density of kilned oat stream constituents; and a second optical sorter which rejects at least one identified non-oat constituent from the kilned oat stream.

2. The system of claim 1 wherein the non-oat constituent comprises a gluten-containing grain.

3. The system of claim 1 wherein each system component before de-hulling is in series.

4. The system of claim 1 wherein each system component after kilning is in series.

5. The system of claim 1 wherein the indentations on each mechanical cleaner comprise a diameter of between about 6 and 8 millimeters.

* * * * *